United States Patent Office

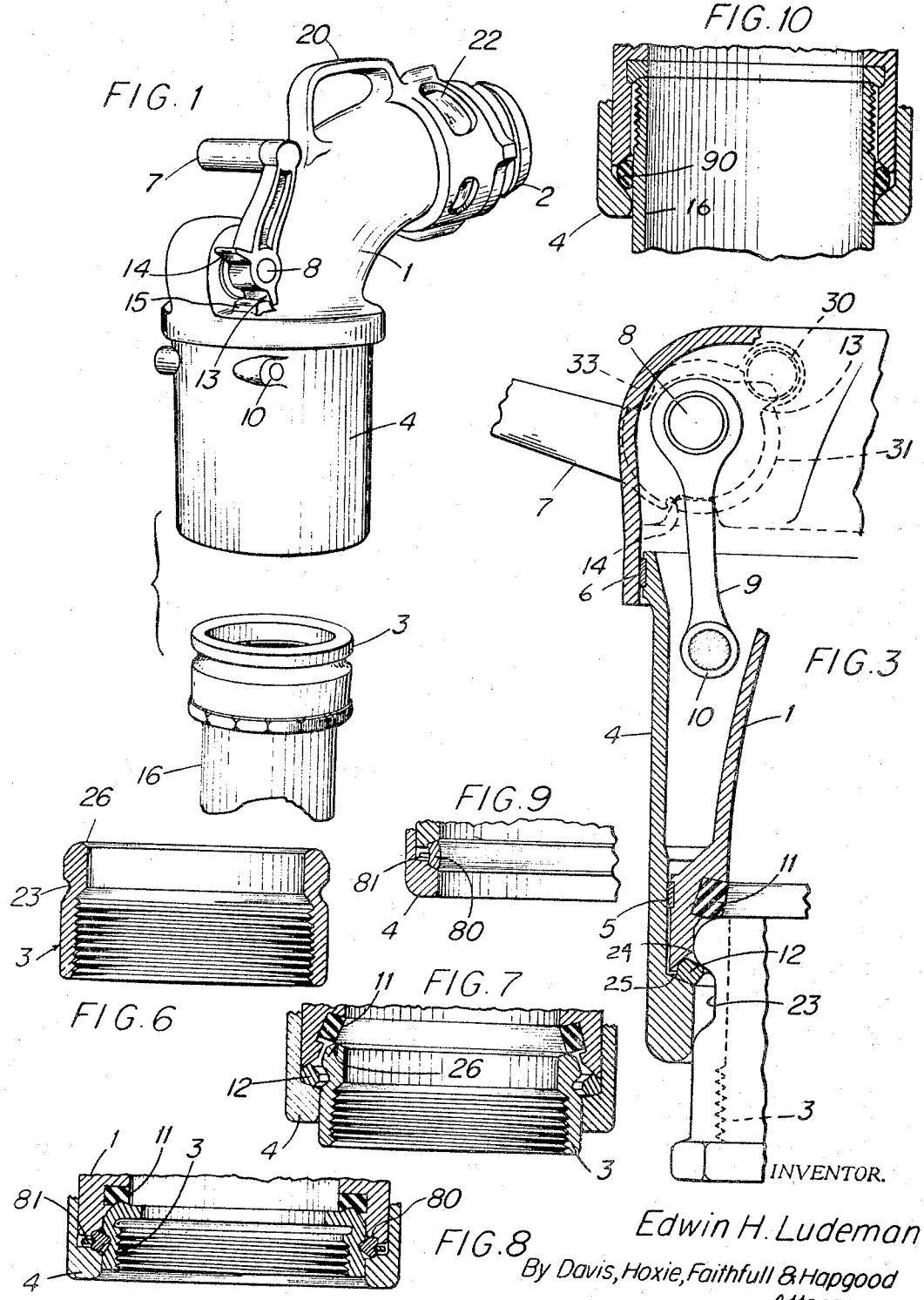

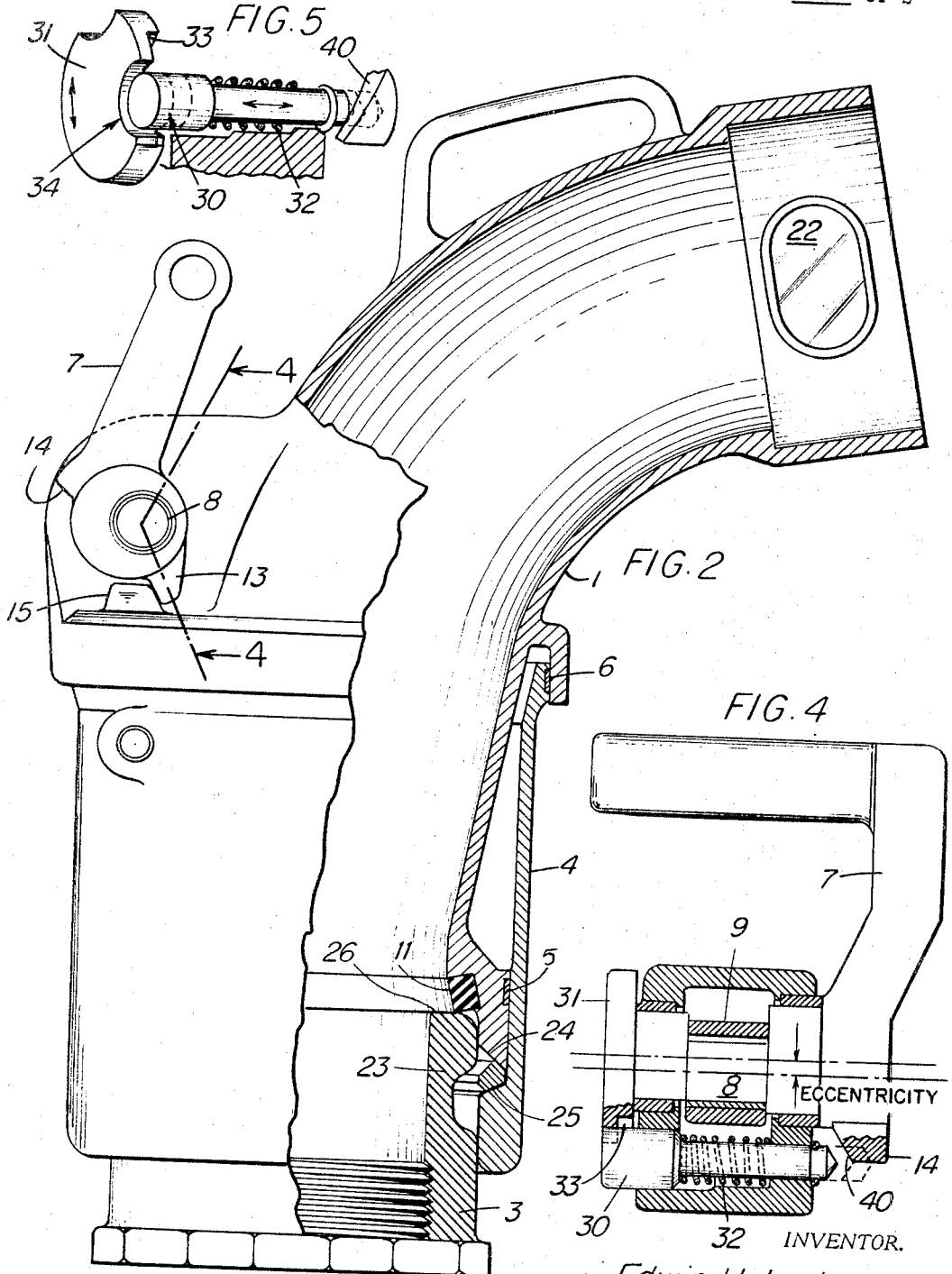

3,432,191
Patented Mar. 11, 1969

3,432,191
SEPARABLE COUPLING
Edwin H. Ludeman, Redbank, N.J., assignor to Andrew Industries Incorporated, Dayton, N.J., a corporation of New Jersey
Filed Oct. 10, 1966, Ser. No. 585,503
U.S. Cl. 285—311
Int. Cl. F16l 37/18, 37/00
6 Claims

ABSTRACT OF THE DISCLOSURE

A separable coupling for engaging a tubular adaptor for such purposes as filling underground storage tanks is provided with a contractable, resilient ring which enters into an external circular groove on the adaptor to secure the coupling on the adaptor. The resilient ring is radially contracted by means of a sleeve which reciprocates with respect to the body of the adaptor. The sleeve and the body are provided with co-operative beveled surfaces above and below the ring which surfaces approach each other to radially contract ring. The mechanism for reciprocating the sleeve is enclosed for protection and includes a self-locking toggle mechanism to lock the adaptor in place. A sealing gasket is provided which is compressed against the adaptor as the resilient ring is contracted.

---

The present invention is related to improvements in coupling devices for hose and the like which are quickly attachable and detachable.

Such coupling devices may be employed to connect a hose to a storage tank for filling thereof. A typical example of such a coupling is shown in the Krapp Patent No. 2,757,944. This typical coupling comprises a coupling member having one or more cam devices associated with a hand lever and an adaptor member having a cam receiving annular groove such that upon assembly of the coupling with the adaptor, manipulation of the levers will cause the associated cams to engage the groove of the adaptor to draw the coupling into intimate sealing contact with the adaptor. Where such couplings are used to transfer fluid material, such as petroleum products from a tank truck transporter to a storage tank, the coupling member having the cams and levers is associated with a hose carried by the truck. The adaptor member is affixed to the storage tank fill pipe. Couplings for this purpose must be sturdy, quickly attachable and detachable, secure in their attachment, must provide leak-proof connection, and must be relatively unaffected by abuse, dirt, ice and the product conveyed.

The cam operated coupling device typical of the prior art utilizes metal cams which directly engage the groove in the adaptor. Repeated motion of the camming surface results in wear of both the cam surface and the adaptor groove. Two cams are usually provided, diametrically opposed to each other. The force for compressing the sealing gasket is derived from the action of the cam on the adaptor groove. Since this force originates in but two points, compression of the gasket is not evenly distributed about the gasket face. That part of the gasket which is not near either of the cams is less highly compressed, thereby inviting leakage. Relatively large lever lengths are required to provide the force necessary to securely engage the members and to compress the sealing gasket. In addition, the motion of the cam with respect to the groove results in a relatively high sliding friction force. The operating levers are therefore, necessarily fairly large and must be turned through approximately a half of a revolution. Where the storage tank fill pipe is located in a confining space as for example, where the tank is an underground storage tank and the fill pipe is located in a manhole, the space required to move the levers demands a manhole having a diameter much greater than that of the fill pipe and adaptor. The operator must use both hands to manipulate the levers. Where the plural cams are connected to a single lever, the operating space requirements are reduced somewhat, but the cams and operating mechanism protrude, thus necessitating clearance space.

Repeated use of such prior art couplings causes wear of the cams and wear of the adaptor groove, thus necessitating replacement of these wearing surfaces. As the respective surfaces of the coupling wear, the motion available for compressing the sealing gasket is reduced. Eventually, leaks occur.

The couplings of the prior art are provided with a resilient flat ring gasket. This gasket mates with a flat annular end surface on the adaptor to seal the coupling to the adaptor to prevent leakage. It has been found that upon release of the compressive force provided by the cams of the prior art couplings, the gasket may adhere to the adaptor fitting. This requires the operator to force the coupling free of the adaptor. Additionally, the adhered gasket is frequently pulled from its seat in the coupling and becomes lost or damaged.

The adaptor fittings typical of the prior art terminate in an annular planar end surface which mates with the resilient gasket of the couplings. Since this sealing surface is located at the extremity of the adaptor, it is subject to wear and damage in use. The surface soon becomes dented and marred and eventually fails to seat properly with the resilient gasket, thereby permitting leakage.

It is an objective of the present invention to provide separable coupling devices which overcome the disadvantages of the prior art.

It is an objective of the present invention to provide a separable coupling device which engages substantially the entire circumference of the adaptor groove.

It is an objective of the present invention to provide a hose coupling which overcomes the disadvantages of the prior art which may be used with prior art adaptors.

It is a further objective of the present invention to provide a separable coupling which requires less space to operate than the prior art couplings of the same internal capacity.

It is a further objective of the present invention to provide a coupling which does not require the use of both hands to operate.

It is still a further objective of the present invention to provide a coupling which, when engaged with an adaptor, is lockable into such engagement to prevent inadvertent release of the coupling.

FIG. 1 is a perspective view of the coupling and adaptor embodying the present invention;

FIG. 2 is a view in partial cross section showing the coupling of FIG. 1 in the open position on a standard fill pipe adaptor;

FIG. 3 is a view partially in cross section showing the coupling of FIG. 2 in the closed position on an adaptor;

FIG. 4 is an enlarged detail view of the hand lever taken along the lines 4—4 of FIG. 2 showing the lock structure;

FIG. 5 is a schematic view of the hand lever lock;

FIG. 6 is a cross sectional view of an improved adaptor;

FIG. 7 is a partial cross sectional view of the coupling of the present invention in the open position in engagement with the improved adaptor of FIG. 6;

FIG. 8 is a partial cross sectional view of another embodiment of the coupling of the present invention in engagement with the improved adaptor of FIG. 6;

FIG. 9 is a partial cross sectional view of the coupling embodiment of FIG. 8 in the open position; and FIG. 10 is a partial cross sectional view of a still further embodiment of the present invention in engagement with a pipe without an adaptor.

FIG. 1 illustrates an embodiment of the present invention as adapted to a fill nozzle of the type which is attached to the hose of a tank truck. The lower portion of the coupling contains the mechanism to couple with a fill pipe adaptor associated with the tank to be filled. The main body casting 1 is curved to facilitate attachment of the generally horizontal hose line to a generally vertical fill pipe. The hose is attached to the coupling by means of an adaptor fitting 2 on the coupling. The lower portion 4 of the coupling contains the coupling mechanism. A hand lever 7 actuates the coupling mechanism. A handle 20 facilitates manipulation of the coupling. A sight glass 22 may be provided to observe the flow. An adaptor 3 for receiving the coupling is shown mounted on a tank fill pipe 16. The relatively smooth and slim configuration of the lower portion of the coupling permits this coupling to be used in filling underground tanks whose fill pipes are located in manholes of relatively small dimension.

Referring now to FIG. 2, the structure of the coupling of FIG. 1 embodying the present invention will be described. The coupling illustrated in FIG. 2 is shown in position on a standard adaptor 3 having a locking groove 23. The lower portion of the main body casting 1 is surrounded by a tubular sleeve 4 which is capable of vertical reciprocation with respect to the main casting 1. Rotation of the lever 7 will cause the sleeve 4 to move selectively vertically in a manner which will be described later. The motion of the sleeve 4 is guided by bearing means 5 and 6 which means also serve to exclude dirt from the actuating mechanism. The product bore of the main body casting terminates in a resilient gasket ring 11 which abuts the top surface 26 of the adaptor 3 when the coupling is placed on the adaptor. The lowest extremity of the main body casting 1 is chamfered to form an annular beveled surface 24. The lower portion of the coupling sleeve 4 protrudes inwardly below surface 24 and is provided with an internal lip having a beveled surface 25. Between the bevels 24 and 25 is located a resilient split ring 12 which is made of Delrin or the like. The split 12 is less than a complete circle to provide the necessary end clearance to permit the split ring to be cammed inwardly to a contracted diameter.

As can be seen in FIG. 2, the handle 7 is provided with stops 13 and 14 which engage a stop member 15 which is integral with the main body casting 1. These stops serve to limit the motion of lever 7 to that necessary for locking and unlocking the coupling.

FIG. 3 shows the structure embodying the present invention in the closed or locked position with the split ring 12 forced into engagement with the locking groove 23 of the adaptor. The hand lever 7 is provided with an eccentric shaft 8 which may be seen in FIG. 3. The eccentric shaft is associated with a connecting link 9 which is pivoted on a pin 10 fixed to the coupling sleeve 4. The eccentricity of shaft 8 causes the center of the shaft 8 to be displaced upwardly as the handle 7 is rotated in a counterclockwise direction. The shaft 8 is brought through and beyond the top dead center or maximum vertical position thereby providing a toggle action to self-lock the sleeve 4 in its upward position.

In operation, the coupling is fitted to the delivery hose. The hand lever 7 is rotated to its raised or unlocked position, thereby allowing the coupling sleeve 4 to descend to its extended position. The coupling is then placed on a standard adaptor 3 thereby aligning resilient gasket 11 with the upper sealing surface 26 of the adaptor. The hand lever 7 is then rotated through approximately 90° to cause the eccentric shaft 8 to lift the connecting link 9 thereby raising sleeve 4 with respect to the main body of the coupling. As the sleeve 4 moves telescopically upward with respect to the main body of the coupling, the distance between the beveled surface 24 of the main body casting and the beveled surface 25 on the inner surface of the coupling sleeve 4 decreases. As the bevels 24 and 25 approach each other, they coact with similar bevels on the outer circumferential surfaces of the split ring 12. The split ring 12 is thus forced radially inwardly and is thereby contracted in diameter. The split ring 12 contacts the upper portion of the groove 23 on the adaptor 3. As the relative motion between the sleeve 4 and the main body 1 continues, split ring 12 is further contracted. As split ring 12 continues to be forced into the groove 23 of the adaptor, the split ring slides on the surface of the groove 23. The coaction of the inner surface of the split ring 12 and the contour of groove 23 causes the entire coupling unit to be drawn downwardly onto the adaptor thereby forcibly compressing the resilient gasket 11 to insure a leak-free union. As the hand lever 7 is further rotated, the eccentric shaft 8 passes through its top dead center position and the center of the shaft is displaced slightly to the left as seen in FIG. 3. This results in a toggle action which locks the coupling to the adaptor.

In order to prevent inadvertent detachment of the coupling during a filling operation, the hand lever 7 is provided with a positive locking mechanism. This mechanism is illustrated in FIGS. 4 and 5. FIG. 4 is a sectional view taken along the lines 4—4 of FIG. 2. FIG. 5 is a schematic view of the locking pin. As can be seen in FIG. 5, the locking pin 30 is urged into a detent 34 in disc 31 which is associated with a hand lever. Thus, when the hand lever is fully rotated counterclockwise to lock the coupling on an adaptor, the pin 30 is urged into locking engagement with the disc 31 by a spring 32 or alternatively by a camming surface 40 on stop 14 on the hand lever. The camming surface 40 assures that the pin 30 will be driven into locking position in the event that dirt or abuse have increased the force necessary to move the pin 30 to a force in excess of the capability of the spring 32. The pin 30, when moved by the spring 32, enters detent 34 on disc 31. When additional friction requires the pin 30 to be moved by the camming surface 40, rather than the spring 32, the pin is driven into locking engagement with an auxiliary detent 33. Provision of the auxiliary detent permits the pin to be pushed back to unlock the hand lever 7.

The operation of the lock mechanism will now be described. As the hand lever 7 is rotated from the unlocked to the locked position, detent 34 in locking disc 31 comes into alignment with spring loaded locking pin 30. The spring 32 urges the locking pin 30 into the detent 34 thereby preventing further rotation of the hand lever 7. When it is desired to disconnect the coupling, the operator must push the locking pin 30 inwardly against the spring 32 to clear the detent 34 and then 33. This permits the hand lever to be rotated upwardly to relax the split ring 12 to free the coupling from the adaptor.

In the event that dirt, ice or abuse have caused the pin 30 to stick in its retracted position, the pin 30 will fail to move into engagement with the detent 34. Continued rotation of the hand lever 7 into its locking position will cause a cam surface 40 on the inner side of stop 14 of the hand lever to engage the end of locking pin 30. The contour of the camming surface 40 is such that the motion of the hand lever forces locking pin outwardly toward its locking position.

Locking is obtained by the camming surface 40 forcing the pin 30 outwards to a position close to but not quite entering detent 34. Locking, in this case, is effected by auxiliary detent 33 which allows only a small and acceptable rotation of the hand lever 7 towards the unlocked position before detent 33 is brought into contact with pin 30.

The split ring 12 is preferably made of Delrin, nylon or the like. Other materials possessing the required qualities of durability, low friction, and elasticity, may be employed. In its unstressed, or maximum diameter position, the diameter of the split ring is large enough to permit insertion of the adaptor into the coupling without interference with the split ring. As can be seen in FIG. 2, the split ring occupies a position recessed with respect to the inner diameter of the coupling sleeve 4. This prevents abuse and undue wear of the split ring.

The angle of the bevel 25 and of the cooperating surface of the split ring 12 is chosen so as to permit the split ring to expand to its unstressed condition by virtue of its inherent elasticity. The ability of the split ring 12 to return to its expanded condition by itself allows for actuation of the coupling mechanism in the absence of an adaptor to urge the split ring to its open position. The split ring springs back to its normal open condition when the hand crank is returned to the open position.

The lower inner surface of the split ring 12 is shaped to permit the adaptor to expand the split ring when the coupling is lowered on an adaptor. The accumulation of dirt may cause the split ring to stick to its closed or smaller diameter position. The provision of this taper on the lower inner surface permits the upper surface of the adaptor to force the split ring to its open position.

Similarly, the upper inner surface of the slit ring 12 is tapered to permit the slit ring to be forced into its open position as the coupling is lifted from an adaptor. This upper inner surface cooperates with the upper portion of the groove of the adaptor to force the split ring outwardly to permit removal of the coupling when the split ring refuses to spring back to its open or unstressed condition.

Thus, the abuses of time, wear, and dirt will not adversely effect the operation of the coupling.

FIGS. 6 and 7 show a cross section through an adaptor especially designed for use with the above-described coupling. Adaptors of the type in common use terminate in a flat sealing at their upper surface 26. Such a prior art adaptor is shown in FIG. 3. The flat plane of the upper surface 26 is provided to mate with a flat ring gasket typically found in prior art couplings. This critical sealing surface becomes marred and dented in use, and in time fails to provide a sufficiently smooth surface for adequate sealing with the flat ring gasket. The adaptor illustrated in FIGS. 6 and 7 is provided with a conical or beveled upper surface 26. This beveled surface is recessed with respect to the extremity of the adaptor. The sealing surface is therefore protected and it is less inclined to be marred or dented in use. The coupling of the present invention utilizes a resilient ring gasket 11 which is canted at an angle approximating the angle of the bevel of the adaptor in FIGS. 6 and 7. Thus, when the coupling is used with the improved adaptor, lower surface of the gasket 11 corresponds with that bevel of the adaptor. This insures a good seal between the coupling and the adaptor.

When a coupling is provided with the canted ring gasket above described, it may be used with equal facility with the improved adaptor of FIGS. 6 and 7 or with flat surface of the adaptor of the prior art. When used with the prior art flat surface adaptor, the gasket first establishes a line contact with the adaptor at the corner edge of the gasket. As the coupling is forced downwardly into locking engagement with the adaptor, the gasket is deformed until the gasket contacts the entire sealing surface of the adaptor. Similarly, when a conventional coupling having a flat ring gasket is used with the beveled adaptor illustrated in FIGS. 6 and 7, a line contact is first established. As the coupling is forced into locking engagement with this improved adaptor, the resilient gasket is deformed to conform with the bevel surface of the adaptor. Thus, both the improved adaptor and the improved coupling are compatable with the fittings of the prior art.

An additional benefit accrues to the use of the canted ring gasket with a conventional flat surface adaptor. The elastic energy stored in the compressed resilient gasket will tend to assist in freeing the gasket from the adaptor when decoupling is desired. Conventional flat gaskets and flat adaptors are inclined to stick together after the gasket compressing force is released. This requires the user to exert some effort in removing the coupling from the adaptor and frequently causes the gasket to be pulled from its seat in the coupling. By progressively compressing the gasket from a line contact to full surface contact, considerable elastic restoring force is introduced to the gasket material. This restoring force causes the gasket to push itself away from the adaptor surface thereby peeling the outer portions of the gasket away from the adaptor surface. This action will continue until the restoring force in the gasket is spent. This occurs when the gasket is fully relaxed and is again making but line contact. It is evident that by canting the gasket, it becomes unlikely that the gasket will adhere to the surface of the adaptor.

FIGS. 8 and 9 show another embodiment of the present invention. In this embodiment, a resilient elastometric ring 80 is provided between the bevel surfaces of the sleeve 4 and the coupling body. A rigid metal ring 81 encircles the elastometric ring 80. As the tubular sleeve 4 is raised with respect to the main body 1, the bevel surfaces 24 and 25 approach each other in the fashion described in some detail in reference to FIGS. 1–3. The elastometric ring is thereby compressed. As the ring is compressed, its inner diameter is reduced. The rigid metal ring 81 prevents the elastometric ring from spreading outwardly and forces the material of the elastometric ring to deform inwardly. Thus, the effective inner diameter of the elastomeric ring is reduced as the coupling is collapsed to its locked position, the reduction of the inner diameter of the elastomeric ring forces the ring into intimate contact with the groove adaptor. The elastomeric ring is useful as a seal, thereby permitting use of the coupling without a gasket 11. Such a gasket, if present, provides an additional seal.

It should be observed that in the embodiments shown in FIGS. 8 and 9, the elastomeric ring may be bonded to the beveled surfaces 24 and 25 thereby completely sealing the mechanism against the intrusion of dirt.

FIG. 10 illustrates a still further embodiment of the present invention. An elastomeric ring 90 is provided in a manner similar to that of the embodiments of FIGS. 8 and 9. This elastomeric ring is not provided with a rigid metal ring at its outer surface. The elastomeric ring 90 of FIG. 10 is suitably shaped and sized to provide adequate inward force when the bevel surfaces 24 and 25 approach each other. As can be observed in FIG. 10 the coupling may be used on a plain pipe 16 of suitable diameter without an adaptor. The telescopic motion of the sleeve 4 with respect to the main body of the coupling, provides sufficient motion to deform the elastomeric ring 90 against a smooth pipe 16. The force thus developed is adequate to insure secure union of the coupling and the pipe. The elastomeric ring 90 will serve as a seal against the adaptor or pipe surface thereby reducing the need for a resilient gasket 11 that is shown in FIG. 10.

I claim:

1. A separable coupling for engaging a tubular adaptor, said coupling comprising a tubular body member having a downwardly and inwardly facing beveled surface at its lower extremity, a reciprocable sleeve surrounding and telescopically guided by the lower portion of said body member and having at its lower extremity an inwardly protruding annular portion provided with an upwardly and inwardly facing bevel on its inner surface, said bevels being divergently arranged and forming an annular channel of variable axial dimension, a resilient adaptor engaging ring interposed between the beveled surface of said body member and the bevel of said reciprocable sleeve, said ring being dimensioned such that its inner diameter is at least as large as the outer diameter of the adaptor member when said channel axial dimension is maximized and is less than said adaptor diameter when said channel axial dimension is minimized, and self-locking toggle action means to telescopically reciprocate said sleeve with respect to said body member, said means including an enclosed eccentric rotatable by an external manual actuator located on an upper portion of said body member and a connecting rod linking said eccentric and reciprocable sleeve, said rod being interior of said reciprocable sleeve, whereby rotation of said eccentric causes the axial dimension of said channel to be reduced to contract the inner diameter of the resilient ring to force the resilient ring into engagement with the tubular adaptor.

2. The coupling of claim 1, wherein the resilient ring is a split ring having outer circumferential surfaces complimentary to said beveled surfaces and having inner circumferential surfaces adapted to engage an annular attachment groove on the exterior of the tubular adaptor.

3. The coupling of claim 1, wherein the resilient ring is an elastomer which is deformable to contract its inner diameter upon reciprocation of said sleeve.

4. The coupling of claim 3, where the outer circumference of the elastomeric ring is encircled by a rigid ring to prevent the elastomeric material from contacting the bottom of the annular channel and to cause the material to deform radially inwardly when the axial dimension of the annular channel is reduced.

5. The coupling of claim 1, including a elastomeric gasket for cooperation with a sealing surface of said tubular adaptor, said gasket being an annular ring of rectangular cross-section which ring is canted into a portion of a cone so as to initially present an edge to the sealing surface of the adaptor.

6. The coupling of claim 1, wherein the self-locking toggle action mechanism is enclosed and protected by said body member and said sleeve, and close fitting annular members being disposed between said body member and said sleeve so as to provide dirt seals.

References Cited

UNITED STATES PATENTS

| | | | |
|---|---|---|---|
| 883,941 | 4/1908 | Eagan | 285—374 X |
| 1,428,933 | 9/1922 | Bean | 285—85 X |
| 1,754,639 | 4/1930 | Meyer | 285—321 X |
| 1,821,862 | 9/1932 | Wilson | 285—334.4 |
| 2,481,258 | 9/1949 | Swartley | 285—374 X |
| 2,482,175 | 9/1949 | Hamilton | 285—312 |
| 2,971,782 | 2/1961 | Sparkman et al. | 285—354 X |
| 3,163,222 | 12/1964 | Foster et al. | 285—18 X |
| 2,455,982 | 12/1948 | Dowty. | |

FOREIGN PATENTS

| | | |
|---|---|---|
| 595,558 | 7/1925 | France. |
| 446,330 | 6/1927 | Germany. |
| 940,025 | 3/1956 | Germany. |
| 1,004,436 | 3/1957 | Germany. |
| 27,271 | 12/1903 | Great Britain. |

CARL W. TOMLIN, *Primary Examiner.*

W. L. SHEDD, *Assistant Examiner.*

U.S. Cl. X.R.

285—321, 315, 332.3, 312